(12) United States Patent
Van Oirschot (10) Patent No.: US 11,396,223 B2
(45) Date of Patent: Jul. 26, 2022

(54) WIND DEFLECTOR ASSEMBLY (71) Applicant: Inalfa Roof Systems Group B.V., Oostrum (NL)

(72) Inventor: Dirk Cornelis Dionisius Maria Van Oirschot, Venray (NL)

(73) Assignee: Inalfa Roof Systems Group B.V., Oostrum (NL)

(*) Notice: Subject to any disclaimer, the term of this patent is extended or adjusted under 35 U.S.C. 154(b) by 0 days.

(21) Appl. No.: 17/022,632

(22) Filed: Sep. 16, 2020

(65) Prior Publication Data
US 2021/0078392 A1 Mar. 18, 2021

(30) Foreign Application Priority Data

Sep. 17, 2019 (EP) .................................... 19197710

(51) Int. Cl.
*B60J 7/22* (2006.01)
(52) U.S. Cl.
CPC ...................... *B60J 7/22* (2013.01)
(58) Field of Classification Search
CPC ................... B60J 7/22; B60J 7/0435
USPC ......................................................... 296/217
See application file for complete search history.

(56) References Cited

U.S. PATENT DOCUMENTS

| 4,482,183 A | 11/1984 | Grimm et al. |
| 4,619,480 A | 10/1986 | Motoyama et al. |
| 4,684,168 A | 8/1987 | Lupo |
| 5,601,330 A | 2/1997 | Ulbrich et al. |
| 5,833,305 A | 11/1998 | Watzlawick et al. |
| 6,082,812 A | 7/2000 | Lenkens et al. |
| 7,533,928 B2 | 5/2009 | Biewer et al. |

(Continued)

FOREIGN PATENT DOCUMENTS

| CN | 206734037 U | 12/2017 |
| CN | 108248353 A | 7/2018 |

(Continued)

OTHER PUBLICATIONS

Bergmiller, "Sunroof Wind Deflector", Jan. 28, 2009, German Patent Office and European Patent Office, EP1745965A2 (Year: 2009).*

(Continued)

*Primary Examiner* — Dennis H Pedder
*Assistant Examiner* — Joyce Eileen Hill
(74) *Attorney, Agent, or Firm* — Steven M. Koehler; Westman, Champlin & Koebler, P.A.

(57) ABSTRACT

The wind deflector assembly moves between a retracted position below the roof opening and an extended position above and comprises a member extends in a transverse direction of the vehicle and is connected with an end to an elongated member and with an end to a stationary part. A pair of arms are connected to the stationary part by slidable hinges. The assembly is biased by a spring in a rearward longitudinal direction. The spring is connected to a second end of the arm. A biasing device urges the arm towards the extended position. The biasing device comprises first and second legs. The first leg loads the assembly between the arm and the stationary part so as to urge the arm towards the extended position. The second leg engages with and extends substantially along the arm. A second end of the first leg is pivotally connected to the stationary part.

11 Claims, 5 Drawing Sheets

(56) References Cited

U.S. PATENT DOCUMENTS

| | | | | |
|---|---|---|---|---|
| 8,459,729 B1* | 6/2013 | Nania | ............... | B60J 7/22 |
| | | | | 296/217 |
| 9,186,971 B1 | 11/2015 | Lee | | |
| 10,399,422 B2 | 9/2019 | Geurts et al. | | |
| 2012/0313401 A1 | 12/2012 | Luecke | | |
| 2015/0284037 A1 | 10/2015 | Kukula et al. | | |
| 2018/0186223 A1* | 7/2018 | Geurts | ............... | B60J 7/22 |

FOREIGN PATENT DOCUMENTS

| | | | | |
|---|---|---|---|---|
| CN | 208812958 U | 5/2019 | | |
| DE | 1263135 B | 2/1968 | | |
| DE | 3908750 C1 | 6/1990 | | |
| DE | 19549200 A1 | 7/1997 | | |
| DE | 102009009465 A1 | 8/2010 | | |
| DE | 102014004992 B3 | 7/2015 | | |
| EP | 1745965 A2 * | 1/2007 | ............ | B60J 7/22 |
| EP | 1844969 B1 | 10/2007 | | |
| EP | 3342612 A1 | 7/2018 | | |
| EP | 3342612 B1 | 8/2020 | | |
| JP | S5889419 A | 5/1983 | | |
| JP | S6078826 A | 5/1985 | | |
| JP | S61169319 A | 7/1986 | | |

OTHER PUBLICATIONS

European Search Report and Written Opinion in corresponding European Patent Application No. 19197710.7, dated Mar. 5, 2020.

* cited by examiner

Fig.1

WIND DEFLECTOR ASSEMBLY

BACKGROUND

The discussion below is merely provided for general background information and is not intended to be used as an aid in determining the scope of the claimed subject matter.

The invention relates to a wind deflector assembly intended for use in front of a roof opening of an open roof construction for a vehicle. The open roof construction comprises a stationary part and a panel capable of closing the roof opening and at least partly opening it. The wind deflector assembly is capable of moving between a retracted position below the roof opening and an extended position above the roof opening and comprises a wind deflector member which extends in a transverse direction of the vehicle and which is connected with an upper end to an elongated member and with an opposite lower end to the stationary part. A pair of wind deflector arms is connected with first ends to opposite ends of the elongated member and of which second ends are connected to the stationary part by slidable hinges and wherein the wind deflector assembly is biased by a spring in a rearward longitudinal direction. The spring is connected to the second end of the wind deflector arm, wherein a biasing device engages the wind deflector arm and urges the wind deflector arm towards the extended position.

A state of art wind deflector assembly comprises a wind deflector assembly which is slidably and pivotably connected to a stationary part and further comprises a biasing device capable of urging the wind deflector from an retracted position to an extended position. The biasing device is mounted on the stationary part in a rotatable manner and has two legs extending from the stationary part, that contribute to the biasing force. Such biasing device is suitable for use in high speed conditions when the wind deflector is in an extended position. Such biasing device may lead to high forces which in turn may lead, under certain circumstances, to false anti-trap phenomena of the anti-trap system of the open roof construction.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background. A wind deflector assembly is a biasing device having a first and second legs integrally connected to each other at first ends of the first and second legs, the first leg loading the wind deflector assembly between the wind deflector arm and the stationary part so as to urge the wind deflector arm towards the extended position and the second leg of the biasing device engaged with and extending substantially along the wind deflector arm, and wherein a second end of the first leg is pivotally connected with regard to the stationary part.

In the description, the explanation is done by explaining the wind deflector assembly by means of one lateral side thereof. It should be noted that the wind deflector assembly is mirror imaged seen in view of a longitudinal vertical plane in the center of the open roof construction and the vehicle.

Due to the biasing device the force for urging the wind deflector assembly towards an extended position and thus upward direction is now formed by only the first leg, which leg is pivotally connected to the stationary part. In the extended position of the wind deflector assembly, the biasing device still biases the wind deflector arm, such that the wind deflector member is kept taut in this position. The position of the biasing device relative to the wind deflector arm and the angle of the first leg with regard to the wind deflector arm is of importance in situations when the wind deflector assembly is in its extended position and when the wind load caused by high speed of the vehicle urges the wind deflector to move downward. This downward movement of the wind deflector is avoided by the biasing device and its first leg which are placed such that the wind load on the wind deflector member marginally influences the extended height of the extended wind deflector assembly. The horizontal rearward directed component of the wind load force is taken up by the substantially horizontally extending slidable hinges of the wind deflector arms in their rear position and the vertical downward component of the wind load force is taken up by the first leg of the biasing device. The angle of the first leg with regard to the wind deflector arm is chosen such that an optimal balance is created between on one hand taking up of the downwardly directed forces urged by the wind load force and on the other hand avoiding that when the panel pushes the wind deflector down upon its closure, forces are kept to an acceptable level avoiding that false anti trap phenomena will occur.

According to an aspect the first leg at the second end comprises a convex part, which forms part of the pivotal connection to the stationary part. The convex part can be formed by just creating a radius shaped bend at the second end of the first leg. The material of the biasing device may be spring steel or another material of the same class of materials. This embodiment is a preferred embodiment and the second end of the first leg forms directly part of the pivotal connection.

According to another aspect, the convex part, with its convex side, engages in a rotatable manner, a concave sliding bearing attached to the stationary part. The concave sliding bearing in this embodiment is an open sliding bearing and can be made of any suitable material, however preferably of a plastic material. The convex part of the first leg can rotatably slide in this concave bearing. The bearing depth and shape is such that the convex part of the first leg cannot slip out of the bearing when the wind deflector assembly is in positions in and between the retracted position and the extended position.

According to another aspect, the concave sliding bearing is made of a thermo-plastic material and in particular made of PET material or of another material of the same class of materials. PET material provides an improved performance as bearing material in relation to wear resistance and low noise performance.

According to another embodiment the first leg may be equipped with a separate part having a convex shape. As an alternative solution the second end of the first leg may be equipped with a separate part such as a plastic mold molded part or a plastic part which is clamped to the second end of the first end. The plastic molded part may be made of PET (polyethylene terephthalate) or another material of the same class of materials. As such, an optimal combination of thermos-plastic materials may be chosen for the separate part and the sliding bearing in relation to wear resistance and noise performance.

According to yet another embodiment, the concave sliding bearing is equipped with a safety catch capable of holding the first leg in such case when the convex part loses contact with the concave sliding bearing. It may be conceivable to have a safety device for such case that the vehicle having the wind deflector in the extended position, is involved in a crash or when the wind deflector member is damaged. The safety catch may be a pin attached to the stationary part forming a bridge around which the convex part or the separate part of the first leg is positioned. Under normal functioning of the wind deflector assembly the pin of the safety catch does not touch the inner side of the convex part of the first leg. In case of an accident or damage of the wind deflector member and the convex part of the first leg or the separate part is lifted off the sliding bearing, the pin of the safety catch holds the convex part of the first leg or the separate part and avoids that the first leg is detached from the stationary part.

According to another embodiment it is conceivable to have the pivotal connection between first leg and stationary part being formed by a hinge construction, formed by a pivot pin attached to either of the stationary part and the first leg and a pivot opening attached to the other of the stationary part and the first leg.

According to yet another embodiment the wind deflector assembly is equipped with a height adjusting device, said device comprising an auxiliary part extending from the wind deflector arm in a lateral direction near the movable connection of the wind deflector arm with the stationary part and an adjustable end stop provided slidably engaged in a longitudinal channel in the stationary part, said end stop being adjustable in substantially longitudinal direction and wherein the adjustable end stop is in engagement with the auxiliary part when the wind deflector member is in an at least extended position.

The end stop is in engagement with the auxiliary part when the wind deflector assembly is in its upmost extended position and wherein the wind deflector assembly is moved to a lower extended position by the adjustment of the end stop against the auxiliary part in a substantially longitudinal forward direction, so as to lower the vertical height of the wind deflector assembly. The height adjusting device may be necessary when the aerodynamics of the vehicle having an open roof construction are such that the height of the wind deflector is required to be adjusted with regard to the vehicle speed because of the noise performance. The noise performance of the open roof construction can be improved by decreasing or by increasing the height of the wind deflector at certain vehicle speeds. When the wind deflector assembly is extended, such height adjusting device, fitted at both lateral sides of the wind deflector assembly, may move the second end of the wind deflector arms in longitudinal forward direction such that the elongated member is moved to a lower height position and also to a longitudinally forward position. As such the wind deflector assembly height can be adjusted manually or automatically when the vehicle speed is increased or decreased and thus the noise performance is improved at that vehicle speed.

According to another aspect, the end stop is slidably arranged in a longitudinal channel in the stationary part and wherein the end stop is driven by a flexible cable connected to a motor device.

BRIEF DESCRIPTION OF THE DRAWINGS

Hereinafter the wind deflector assembly will be further elucidated while referring to the drawings, in which.

DETAILED DESCRIPTION OF THE ILLUSTRATIVE EMBODIMENTS

Figure 1:
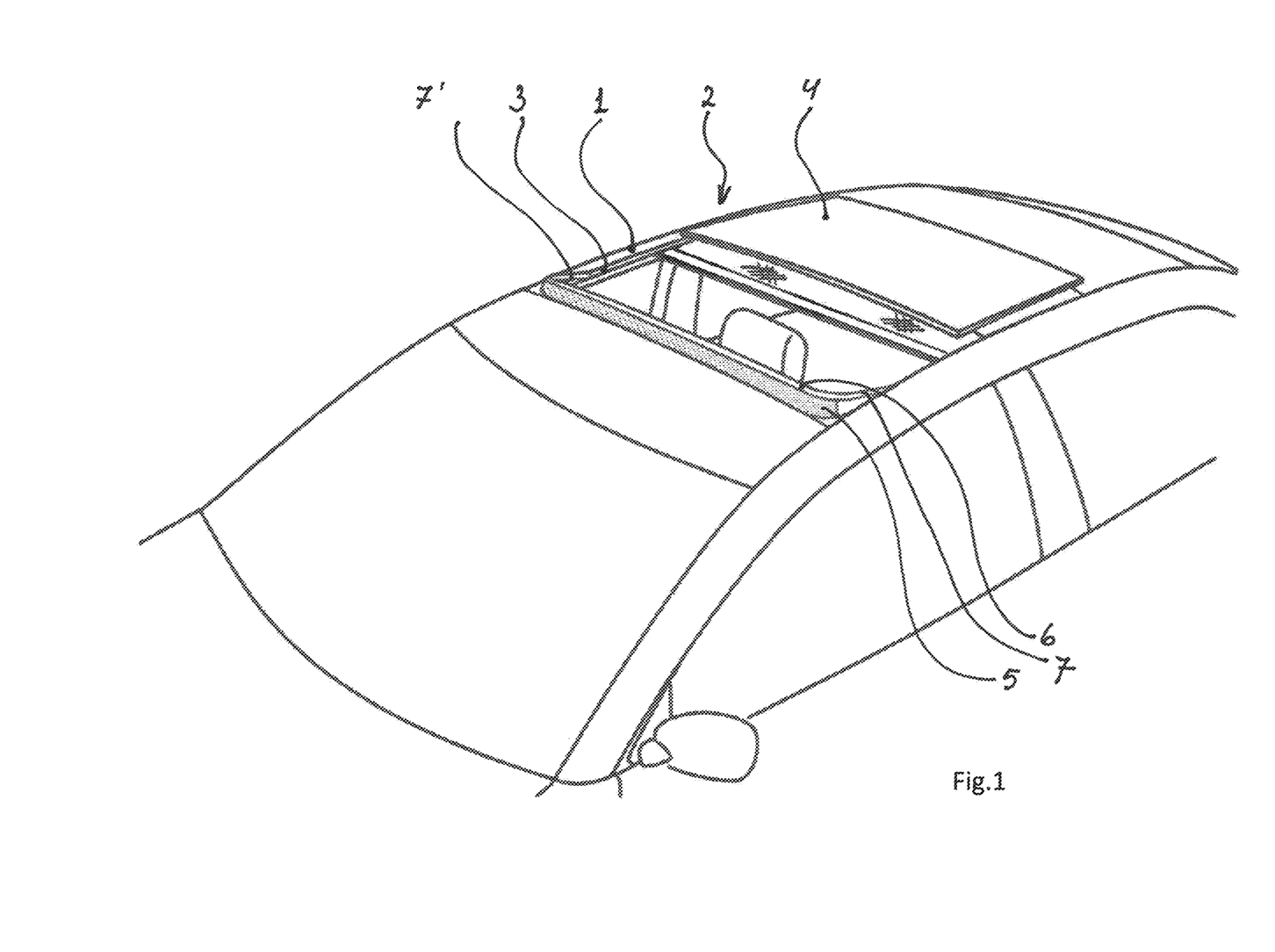
FIG. 1 is a schematic perspective view of a vehicle roof having an open roof construction comprising the wind deflector assembly.
Figure 2:
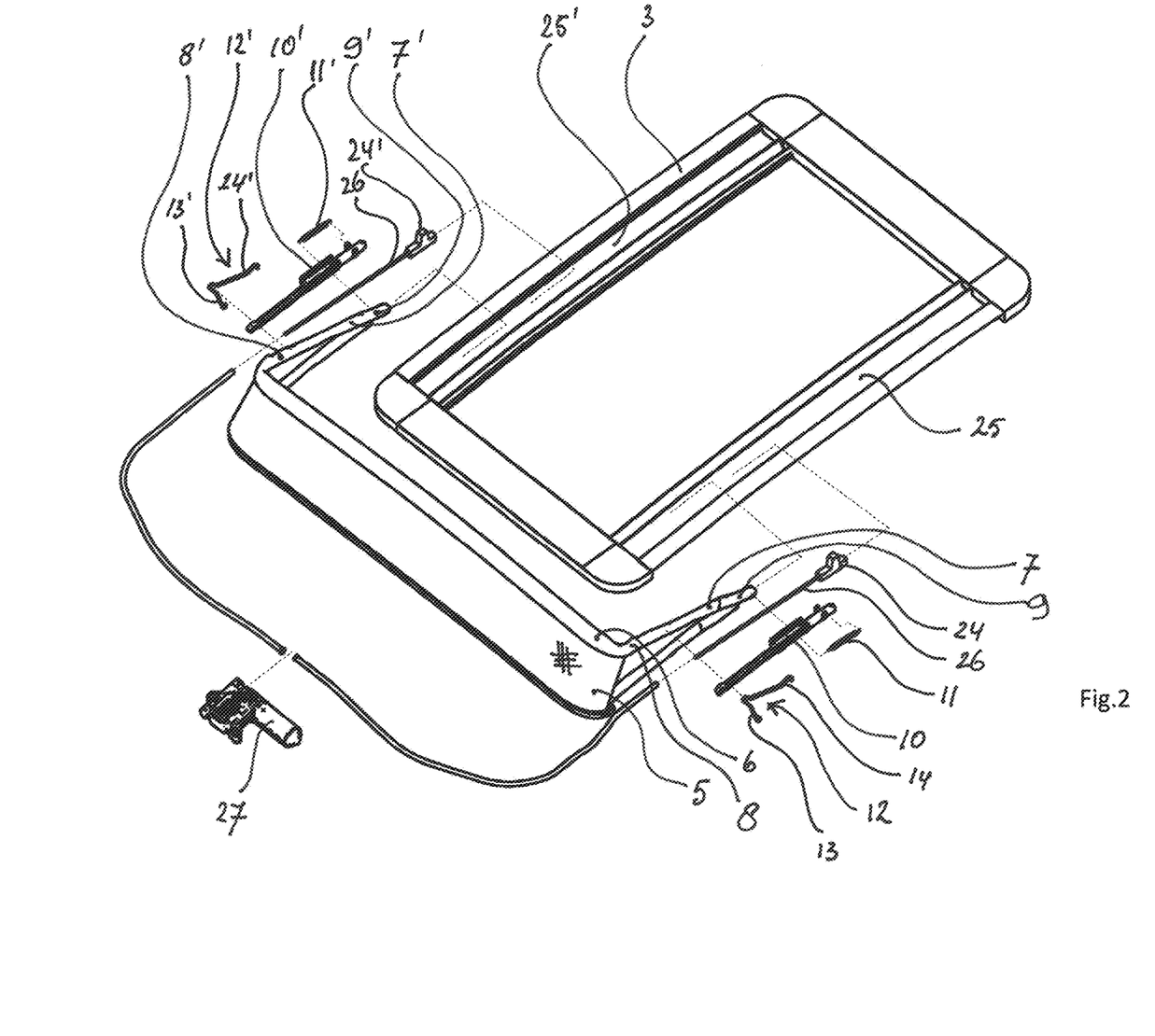
FIG. 2 is an exploded view of a part of the open roof construction including a wind deflector assembly.

Referring to FIGS. 1 and 2, a wind deflector assembly is shown in the open roof construction 2 of a vehicle. In the roof of the vehicle the roof opening 1 is shown which can be opened and closed by a movable panel 4. The panel 4 is a rigid part, which is made of partly transparent glass or of a plastic material. The open roof construction 2 may be a single panel construction, or a multiple panel construction whereby just one panel or more panels are openable. Furthermore the open roof construction 2 comprises a stationary part 3 with which it is connected to the body of the vehicle.

As is shown in FIG. 2, the stationary part 3 comprises at each lateral side guides equipped with extruded channels 25, 25' directed in longitudinal direction of the vehicle and open roof construction, whereby the channels in the guide may guide flexible drive cables 26, 26' which are driven by an electric motor device 27. (reference numerals with ' denote similar parts on the opposite longitudinal side of the stationary part 3) The drive cables 26, 26' are connected to the panel 3 and/or to the wind deflector assembly to move these parts in a longitudinal direction. To be able to influence the flow pattern of air over the roof opening 1 when the panel 4 is in an open position (here moved rearwardly to a position above the roof of the vehicle) a wind deflector assembly is positioned near the front edge of the roof opening 1.

Such wind deflector assembly comprises an elongated member 6 extending in transverse direction and being connected to, at each opposite end, to a pair of first ends 8, 8' of wind deflector arms 7, 7'. Further a wind deflector member 5 extends along the transverse length of the elongated member 6 and is connected between the elongated member 6 and the stationary part 3, i.e. the wind deflector member 5 is attached at its upper end to the elongated member 6 and at its lower end to the stationary part 3. It may be conceivable that the wind deflector member 5 extends around the curved corners, formed by the connection between the elongated member 6 and the wind deflector arms, towards the end of the wind deflector arms 7, 7'. The wind deflector member 5 comprises a flexible air permeable material which may be elastic. On account of the air permeability, the air flows through the wind deflector member 5 and because of its aerodynamic resistance it causes an air turbulence just behind the wind deflector assembly, above the roof opening 1. These turbulences may avoid or reduce the phenomena of buffeting.

The wind deflector arms 7, 7' are connected to the stationary part 3 by slidable hinges 10, 10', which comprises pins connected to each of second ends 9, 9' of the wind deflector arms 7, 7', said pins sliding in a slotted hole extending in longitudinal direction of the vehicle and connected to the stationary part 3. A pull spring 11, 11' is attached to the second end 9, 9' of the wind deflector arm 7, 7' and is on its opposite end attached to the stationary part 3. The spring 11, 11' ensures that the slidable hinges 10, 10' are always in their rear position when the wind deflector is in its extended position, so that the extended position is always the same. The spring 11, 11' also prevents rattling of the hinges 10, 10' within the slotted holes. Furthermore, a biasing device 12, 12' is provided comprising a first leg 13, 13' and a second leg 14, 14'. The second leg 14, 14' is mounted to the wind deflector arm 7, 7' and the first leg 13, 13' is pivotally connected with regard to the stationary part 3. Furthermore in FIG. 2 an adjustable end stop 24, 24' is shown driven by a flexible drive cable 26, 26' connected to an electric motor device 27 which drives the drive cable 26, 26'. The end stop 24, 24' may be engaged with an auxiliary part 23, 23' (shown in FIG. 8A, 8B) extending laterally of the wind deflector arm. The end stop 24, 24' is slidably movable in a channel 25, 25' in the stationary part 3. When the wind deflector assembly is in an extended position the end stop 24, 24' may be moved in a forward direction. This movement causes the wind deflector arm 7, 7' (via the auxiliary part) to move forward, whereby the elongated member 6 also moves in forward direction and to a lower position in height as can be seen in FIG. 8B.

Figures 3A, 3B:
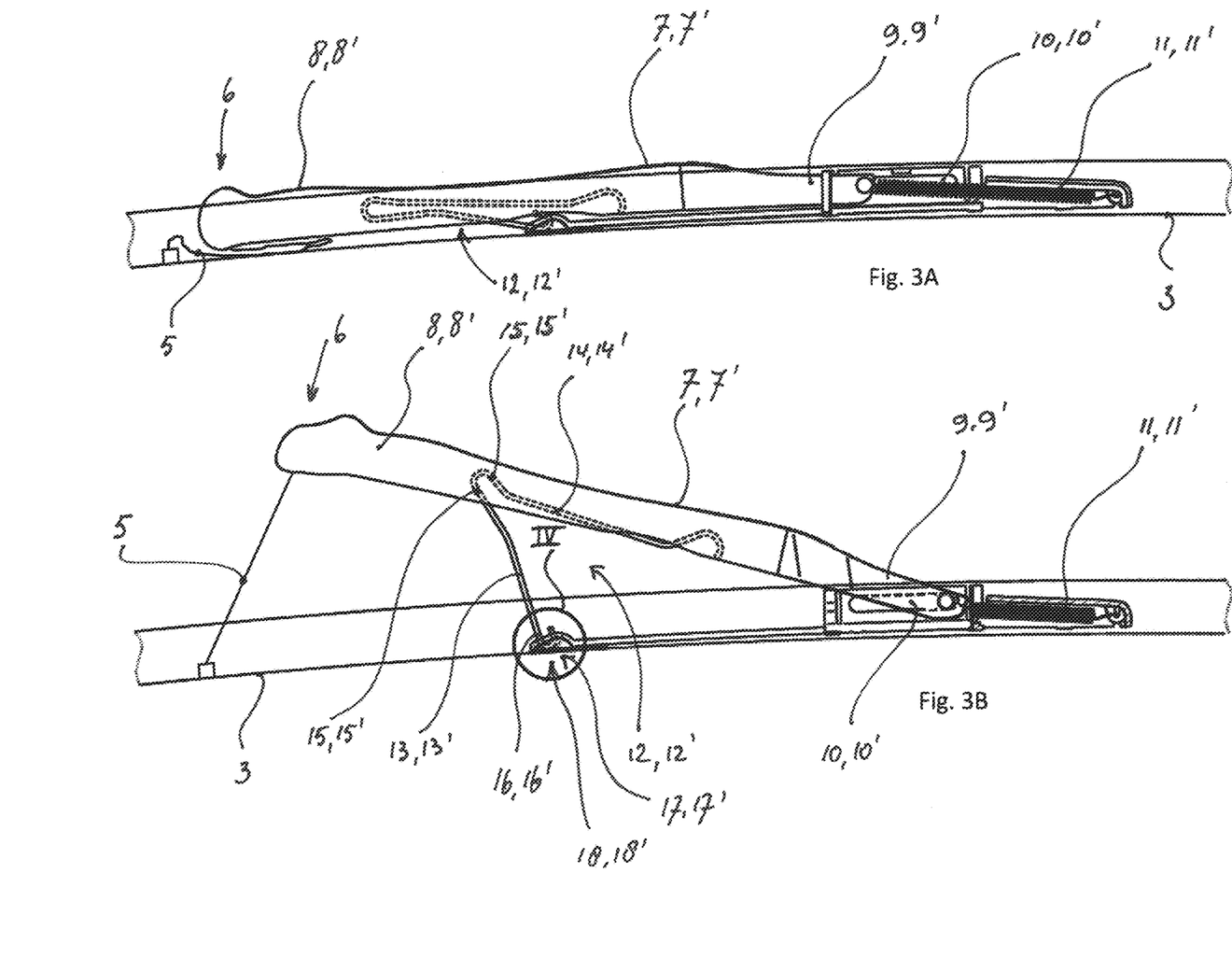
FIGS. 3A and 3B are schematic side views of the wind deflector assembly of FIG. 2 in the retracted and the extended position.

In FIG. 3A, 3B the wind deflector arm 7, 7' is shown in respectively the retracted position and in the extended position. The wind deflector assembly is pushed downward into the retracted position by the panel 4 (only shown in FIG. 1) when panel 4 is being closed. The panel 4 comprises slide pads or other means to slidably push down the wind deflector assembly. Usually the wind deflector arms 7, 7' are engaged by the panel 4 when the panel 4 is being closed. In the retracted position the elongated member 6 is pushed down to below the opening 1 in the roof of the vehicle. The biasing device 12, 12' is compressed fully in this position and biases the wind deflector arm in a vertical upward direction.

The biasing device comprises first and second legs 13, 13'; 14, 14', which are integrally connected to each other, preferably as a single unitary body, at first ends 15, 15' of the first and second legs 13, 13' and 14, 14'. Nevertheless in this retracted position the wind deflector arms 7, 7' and the rest of the wind deflector assembly are kept in the retracted position by means of the panel 4. The pins in the slidable hinges 10, 10' at the second end 9, 9' of the wind deflector arms 7, 7' are now positioned substantially at the forward area of the slotted holes. The spring 11, 11' is now biasing the second end 9, 9' of the wind deflector arm 7, 7' in a longitudinal direction to the rear and is extended towards its maximum length. Once the panel 4 slides to an open position the wind deflector assembly gradually moves in a substantially vertical direction towards the extended position. This upward movement is caused by the biasing force of the biasing device 12, 12'. This biasing force is mainly caused by the bending of the biasing device in the neighbourhood of the ends 15, 15' of the first and second legs 13, 13' and 14, 14', but also deformation of the legs themselves may cause the biasing force.

The pins in the slidable hinges 10, 10' are now moved to the rear part of the slotted holes and the length of the spring 11, 11' is now reduced, but is still biasing the second end 16, 16' of the first leg 13, 13' into a longitudinal rearward direction. Once the extended position is reached, the wind deflector member 5 is completely taut, however still the biasing device 12, 12' exerts a biasing force to the wind deflector arms 7, 7', which biasing force is lower than it is in the retracted position, because the angle between the first and second legs 13, 13' and 14, 14' has been increased and the spring action has thus diminished to a certain extent. A comparison of FIGS. 3A and 3B illustrate the deformation. The biasing device 12, 12' and the spring 11, 11' together ensure a reliable movement of the wind deflector assembly between its retracted and extended positions both in longitudinal and vertical directions.

Figures 4, 5A, 5B, 6, 7A, 7B:
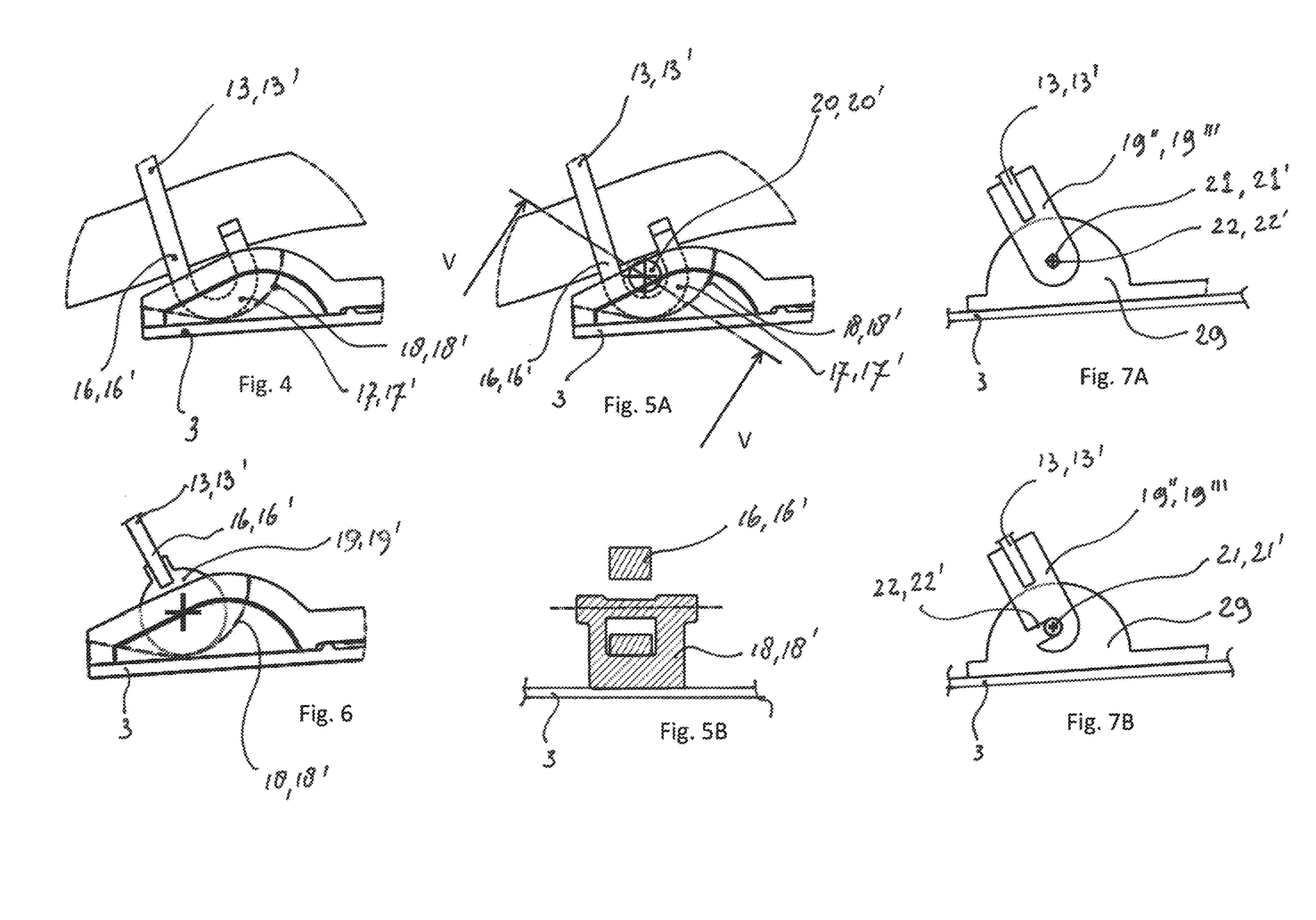
FIG. 4 shows detail IV in FIG. 3 on a larger scale, being a schematic side view of the first leg of the biasing device and the sliding bearing.
FIGS. 5A and 5B are respectively a schematic side view of the first leg of the biasing device and a sectional view according to line V-V in FIG. 5A.
FIGS. 6, 7A and 7B are schematic side views of embodiments of the engagement of the first leg of the biasing device with the sliding bearing.

As is shown in FIGS. 3B and 4, the convex part 17, 17' of the first leg 13, 13' of the biasing device 12, 12' is pivotally engaged with a concave sliding bearing 18, 18' connected to the stationary part 3. The concave sliding bearing 18, 18' has a surface large enough to accommodate the full circumvention of the convex part 17, 17' of the first leg 13, 13' in both retracted and extended position of the wind deflector assembly. The second leg 14, 14' of the biasing device 12, 12' is clamped inside the wind deflector arm (not shown) by means of a click fixing or by means of a positive fixing such as a by means of a screw or by means of a supporting bracket and a screw in order to fix the second leg 14, 14' with respect to the wind deflector arm 7, 7.

In FIG. 4 the convex part 17, 17' of the first leg 13, 13' engaging in the concave sliding bearing 18, 18' is shown in more detail. As written above, the convex part 17, 17' may be a bend part of the first leg 13, 13' of the biasing device 12, 12'. In FIG. 4 the connection of the first leg 13, 13' and the convex part 17, 17' shows that the convex part 17, 17' is open at the rear, seen in a longitudinal direction. It is conceivable that the convex part 17, 17' is open at the front.

In FIGS. 5A and 5B a safety catch 20, 20' is shown, whereby the safety catch 20, 20' may be a pin attached like a bridge to the stationary part 3 and whereby the convex part 17, 17' at the second end 16, 16' of the first leg 13, 13' is circumventing the pin of the safety catch 20, 20' substantially completely. The convex part 17, 17' does not touch the pin of the safety catch 20, 20' in normal operation. Only when in case of exceptional circumstances such as in a crash situation with the vehicle, the convex part 17, 17' is lifted from the sliding bearing 18, 18', and the pin of the safety catch 20, 20' will hold the convex part 17, 17' as a safety measure.

In FIGS. 6, 7A and 7B other embodiments are shown for the second end 16, 16' of the first leg 13, 13' of the biasing device 12, 12'. In FIG. 6 the second end 16, 16' comprises a separate part 19, 19', which is a plastic injection molded convex shaped part, molded to the second end 16, 16' of the first leg 13, 13'. It is conceivable that this separate part 19, 19' is a solid part made of thermoplastic material or comprises a hole in the center of rotation, such that this separate part 19, 19' is made suitable to be functionally combined with a safety catch 20, 20' such as is described before.

In FIG. 7A a fixed hinge construction is shown whereby a separate part 19", 19'" is attached to the first legs 13, 13' end. This plastic separate part 19", 19'" comprises a hole 22, 22' through which a pin 21, 21' is placed, which pin 21, 21' is attached to a hinge block 29 attached to the stationary part 3. It is conceivable that pin 21, 21' and hole 22, 22' are interchanged, in that the pin 21, 21' is attached to the plastic part and the hole 22, 22' is formed in the hinge block 29 on the stationary part 3. A similar hinge construction is shown in FIG. 7B, although here a slotted hole 22, 22' in the plastic molded part 19, 19' is formed such that an easy assembly of the wind deflector assembly to the stationary part 3 is guaranteed.

Figure 8A:
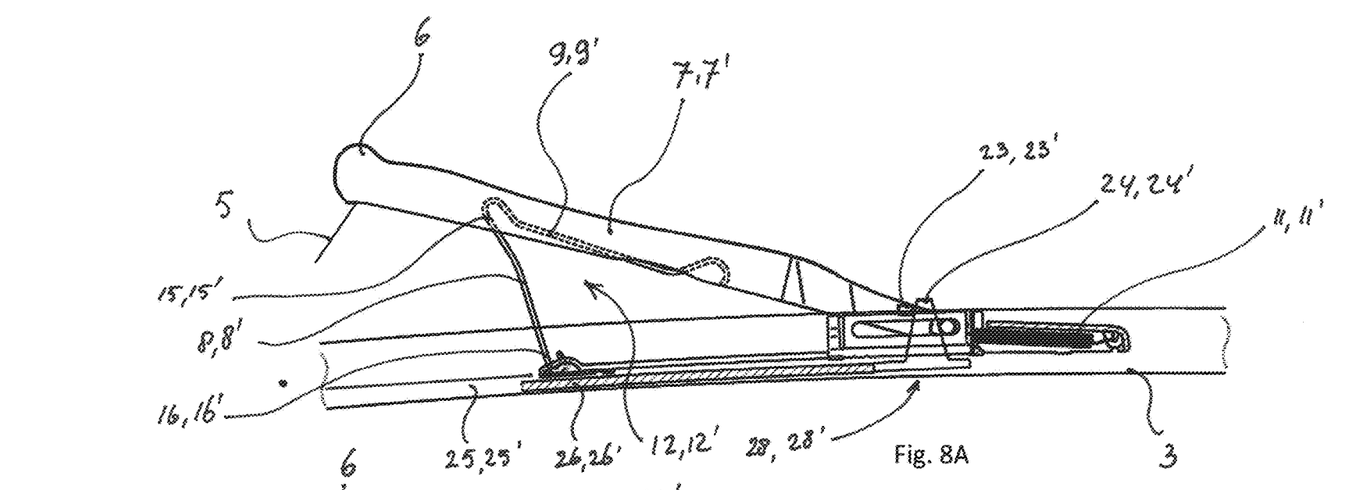
FIGS. 8A and 8B are schematic side views of the wind deflector assembly further showing the principle of a height adjusting device in two positions of the wind deflector assembly.
Figure 8B:
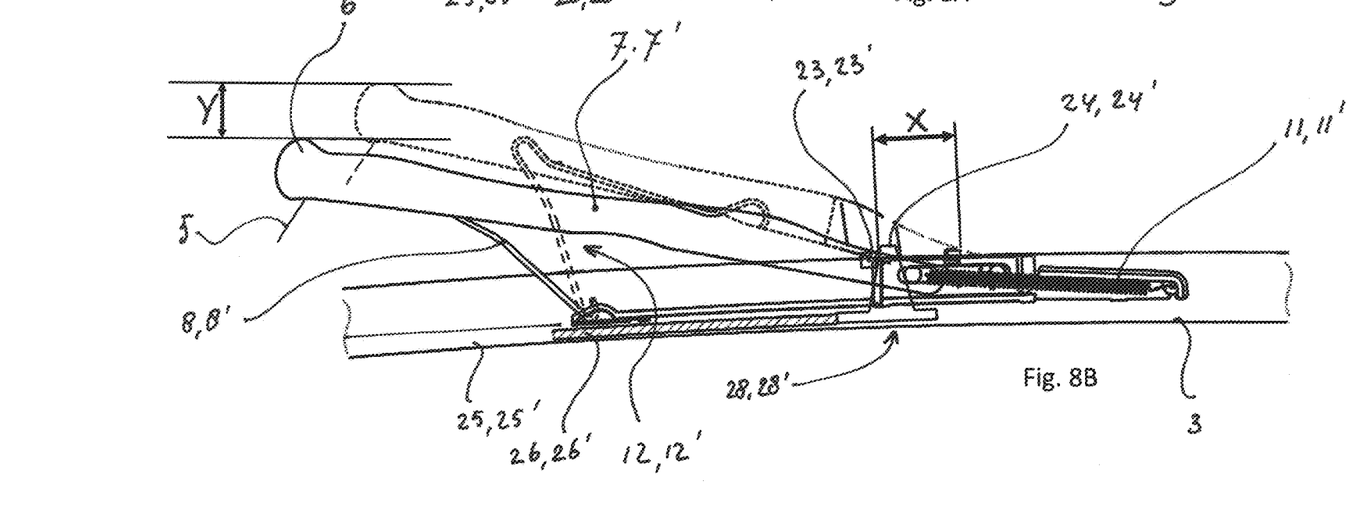

In FIGS. 8A and 8B the height adjusting device 28, 28' is shown. In FIG. 8A an upper position of the wind deflector assembly is shown whereby the elongated member 6 is positioned in its highest position. The end stop 24, 24' is in engagement with the auxiliary part 23, 23' on the wind deflector arm 7, 7'. The end stop 24, 24' is an adjustable part which is slidably engaged in a longitudinal channel 25, 25' formed in the guide which is part of the stationary part 3. The end stop 24, 24' is driven by the flexible drive cable 26, 26', which in turn is driven by an electric motor device 27 (see FIG. 2). In FIG. 8B the end stop 24, 24' is moved forward by the driveline of the drive cable 26, 26' and motor device 27. The pin of the slidable hinges 10, 10' is moved in forward direction by a distance X to a position substantially in the forward area of the slotted hole of the slidable hinge 10, 10'. The spring 11, 11' is extended and the wind deflector arm 7, 7' has moved in forward direction by said distance X, but also has been lowered a certain amount of height Y at the position of the elongated member 6. Thus the elongated member 6 is now placed in a lower position which changes the aerodynamic surface of the wind deflector member 5 and therewith of the wind deflector assembly.

The invention is not limited to the embodiments described before which may be varied widely within the scope of the invention as defined by the appended claims.

What is claimed is:

1. A wind deflector assembly intended for use in front of a roof opening of an open roof construction for a vehicle, the open roof construction comprising a stationary part and a panel capable of closing the roof opening and at least partly opening it, the wind deflector assembly being configured to move between a retracted position below the roof opening and an extended position above the roof opening, the wind deflector assembly comprising:
   an elongated member having opposite ends,
   a wind deflector member which extends in a transverse direction of the vehicle and which is connected at an upper end to the elongated member and at an opposite lower end to the stationary part,
   a pair of wind deflector arms each arm connected at a first end to one of the opposite ends of the elongated member and at a second end to the stationary part by a slidable hinge,
   a pair of springs wherein a spring is connected to the second end of each wind deflector arm, the springs being configured to bias the wind deflector assembly in a rearward longitudinal direction,
   a pair of biasing devices, wherein a biasing device engages each wind deflector arm and urges the wind deflector arm towards the extended position,
   wherein the biasing device comprises first and second legs integrally connected to each other at first ends of the first and second legs, the first leg extending between the wind deflector arm and the stationary part so as to urge the wind deflector arm towards the extended position in cooperation with the second leg,
   wherein the second leg of the biasing device is engaged with and extends substantially along at least a part of the wind deflector arm,
   wherein a second end of the first leg is pivotally connected with regard to the stationary part, and
   wherein the first leg is the only biasing connection of the biasing device extending between the stationary part and the wind deflector arm.

2. The wind deflector assembly according to claim 1, wherein the first leg at the second end comprises a convex part, which forms part of a pivotal connection to the stationary part.

3. The wind deflector assembly according to claim 2, wherein said convex part of the first leg, with its convex side, engages in a rotatable manner, a concave sliding bearing attached to the stationary part.

4. The wind deflector assembly according to claim 3, wherein the concave sliding bearing is made of a thermo-plastic material.

5. The wind deflector assembly according to claim 4 wherein the thermo-plastic material is a PET material.

6. The wind deflector assembly according to claim 1, wherein the first leg is equipped at a second end with a separate part having a convex shape.

7. The wind deflector assembly according to claim 3, wherein the concave sliding bearing is equipped with a safety catch configured to hold the first leg in such case when the convex part loses contact with the concave sliding bearing.

8. The wind deflector assembly according to claim 1, wherein the pivotal connection between the first leg and the stationary part is formed by a hinge construction.

9. The wind deflector assembly according to claim 1, and further comprising a height adjusting device, said height adjusting device comprising:
   an auxiliary part extending from the wind deflector arm in a lateral direction near a movable connection of the wind deflector arm with the stationary part, and
   a movable end stop provided slidably engaged in a longitudinal channel in the stationary part, said end stop being configured to move in a substantially longitudinal direction, wherein the movable end stop is configured to engage the auxiliary part when the wind deflector member is in an at least extended position.

10. The wind deflector assembly according to claim 9, wherein the end stop is configured to engage the auxiliary part when the wind deflector assembly is in the extended position and wherein the wind deflector assembly is moved to a lower extended position by the movement of the end stop against the auxiliary part in a substantially longitudinal forward direction, so as to lower a vertical height of the wind deflector assembly.

11. The wind deflector assembly according to claim 10, wherein the end stop is slidably arranged in a longitudinal channel in the stationary part and wherein the end stop is driven by a flexible cable connected to a motor device.

* * * * *